United States Patent
Staats, Jr.

(10) Patent No.: US 10,422,590 B2
(45) Date of Patent: Sep. 24, 2019

(54) AIR BEARING HEAT EXCHANGER

(71) Applicant: National Technology & Engineering Solutions of Sandia, LLC, Albuquerque, NM (US)

(72) Inventor: Wayne Lawrence Staats, Jr., Livermore, CA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 115 days.

(21) Appl. No.: 15/715,997

(22) Filed: Sep. 26, 2017

(65) Prior Publication Data
US 2019/0093962 A1 Mar. 28, 2019

(51) Int. Cl.
F28F 3/02 (2006.01)
F16C 32/06 (2006.01)
F28F 27/00 (2006.01)
H02K 9/06 (2006.01)
F16C 21/00 (2006.01)
F28F 5/00 (2006.01)
(Continued)

(52) U.S. Cl.
CPC .............. F28F 3/02 (2013.01); F16C 21/00 (2013.01); F16C 32/0614 (2013.01); F16C 32/0622 (2013.01); F16C 32/0625 (2013.01); F28F 27/00 (2013.01); H02K 9/06 (2013.01); F16C 17/04 (2013.01); F16C 19/06 (2013.01); F16C 32/06 (2013.01); F16C 32/0603 (2013.01); F16C 2360/46 (2013.01); F28F 5/00 (2013.01); F28F 2250/08 (2013.01); F28F 2280/10 (2013.01)

(58) Field of Classification Search
CPC ......... F28F 3/02; F28F 27/00; F28F 2250/08; F28F 2280/10; F16C 21/00; F16C 32/06; F16C 32/0603; F16C 32/0614; F16C 32/0622; F16C 32/0625; F16C 17/04; H02K 9/06
USPC ........................................ 165/244
See application file for complete search history.

(56) References Cited

U.S. PATENT DOCUMENTS 6,332,758 B1 * 12/2001 Tang .................. F04D 25/0606
                                                    417/354
8,228,675 B2    7/2012 Koplow
(Continued)

OTHER PUBLICATIONS

Johnson et al., "Development of the Sandia Cooler", Dec. 2013, available at <URL: https://ip.sandia.gov/techpdfs/Development%20of%20Sandia%20Cooler%20SAND2013-10712.pdf>, pp. 1-30 138-163.

Primary Examiner — Joel M Attey
(74) Attorney, Agent, or Firm — Medley, Behrens & Lewis, LLC

(57) ABSTRACT

The various technologies presented herein relate to fabrication and operation of a heat exchanger that is configured to extract heat from an underlying substrate. Heat can be extracted by way of an air gap formed between an impeller and a baseplate. By utilizing a pump to create an initial air gap that is further maintained by rotation of the impeller relative to the baseplate, a spring can be utilized that can apply a force of greater magnitude to the impeller than is used in a conventional approach, thus enabling the weight of the impeller to be negligible with respect to a width of the air gap, thereby conferring the desirable feature of orientation independence with respect to gravity with no performance degradation.

9 Claims, 8 Drawing Sheets

SECTION B-B

(51) Int. Cl.
*F16C 17/04* (2006.01)
*F16C 19/06* (2006.01)

(56) References Cited

U.S. PATENT DOCUMENTS

| | | |
|---|---|---|
| 8,753,014 B2 | 6/2014 | Devitt |
| 9,207,023 B2 | 12/2015 | Koplow |
| 9,261,100 B2 | 2/2016 | Koplow |
| 9,441,668 B2 | 9/2016 | Devitt |
| 2006/0283712 A1* | 12/2006 | Cohen .................... B33Y 10/00 205/118 |
| 2011/0103011 A1 | 5/2011 | Koplow |
| 2012/0055653 A1 | 3/2012 | Chen et al. |
| 2014/0286599 A1 | 9/2014 | Devitt et al. |
| 2015/0219117 A1 | 8/2015 | Heli |
| 2016/0360645 A1 | 12/2016 | Achard et al. |

* cited by examiner

AIR BEARING HEAT EXCHANGER

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

In 1965, Gordon Moore proposed that the number of transistors in a dense integrated circuit would double every year, aka. "Moore's Law". Moore's prediction proved accurate for a number of decades, however various technical challenges have impeded the semiconductor industry in maintaining the initial predicted rate of growth. Currently, the predicted rate of growth is a doubling in component density every 2.5 years. One limitation on sustaining the growth initially predicted by Moore is the challenge in removing heat from a central processing unit (CPU) generated during operation of the CPU. A modern CPU can generate in excess of 100 W of waste heat, wherein the limitations of state-of-the-art thermal management technology fall short of what is required to sustain the growth curve of Moore's Law, a situation that has been termed the "thermal brick wall" problem.

FIG. 6 (prior art) illustrates a heat exchanger 600 (aka "SANDIA COOLER") configured to extract heat energy from an underlying structure, as disclosed in U.S. Pat. No. 8,988,881. Heat exchanger 600 comprises a heat sink impeller (HSI) 605, which is configured to spin above a baseplate 610. Heat is removed from a component (e.g., a CPU or GPU) thermally attached to the bottom of the baseplate 610. The interior of the baseplate 610, in the embodiment depicted in FIG. 6, comprises a vapor chamber 612 to uniformly transmit a concentrated heat load entering the bottom surface of the baseplate 610 to the upper surface of the baseplate 610. The heat then flows across a thin air bearing and into the HSI, where it is rejected to the ambient surroundings by transferring from the HSI fins into the radially outward air flow.

Rotation of the HSI 605 is provided by a motor 645 (e.g., a brushless motor) connected to the bladed rotor 605 by a spindle 620. As the HSI 605 rotates, the plurality of blades cause air to be drawn from the ambient surroundings of the HSI 605 into the central portion and then down along the central region of the spindle 620, where the air exits the HSI 605 radially through the blades. Lift of the HSI 605 from the baseplate 610 is created due to relative rotation of the stationary baseplate and the rotating HSI 605 (e.g., through use of a series of spiral-shaped grooves in the baseplate 610), wherein the air gap is a hydrodynamic air bearing. With continued operation of the HSI 605, the air gap is maintained, while heat travels across the air gap and is rejected to the ambient surroundings through the HSI 605 (i.e., into the air that flows radially through the blades).

The air bearing comprises a portion of the thermal circuit, and therefore it is important to ensure that it remains thin (on the order of 10 microns) to keep a low thermal resistance and avoid performance loss. In the conventional heat exchanger 600, for optimal performance, orientation of the heat exchanger 600 is limited to a single orientation, where the baseplate 610 is placed on top of a surface, and the HSI 605 is above the baseplate 610. This is because the weight of the HSI 605 (along with a spring 630 that provides a force that is less than the weight of the HSI 605) is used to maintain the thickness of the air gap (e.g., the weight of the HSI 605 prevents the air gap from becoming too large). If the orientation of the heat exchanger 600 were to be altered (e.g., such that the HSI 605 were below the baseplate 610), then the size of the air gap would be larger than desired.

SUMMARY

The following is a brief summary of subject matter that is described in greater detail herein. This summary is not intended to be limiting as to the scope of the claims.

Various exemplary embodiments presented herein relate to design, fabrication, and implementation of a heat exchanger that is configured to extract heat from an underlying substrate. A heat exchanger described herein includes a baseplate and a heat sink impeller (HSI), wherein during operation of the heat exchanger the baseplate is separate from the HSI by an air bearing, wherein the air bearing can initially be a hydrostatic air bearing at startup of the heat exchanger, and further wherein the air bearing can be transformed to a hydrodynamic air bearing as the HSI rotates relative to the baseplate. In contrast to the conventional heat exchanger described above and shown in FIG. 6, the heat exchanger described herein includes a pump that is configured to generate the hydrostatic air bearing at startup of the heat exchanger. The pump provides air at a higher-than-ambient pressure to the inner radial portion of the air gap between the baseplate and the HSI, in a manner that is analogous to the example of an air hockey table/puck. Effectively, then, the pump causes the HSI to "lift off" from the baseplate prior to the HSI being rotated, thereby avoiding undesired wear that would otherwise be caused by friction between baseplate and the HSI as the HSI rotates relative to the baseplate. In an exemplary embodiment, the pump is a diaphragm pump that is configured to generate sufficient pressure to ensure that the lifting force on the HSI greatly exceeds the weight of the HSI.

The heat exchanger also comprises a spring that is configured to exert a compressive force between the HSI and the baseplate (i.e., the spring pushes the HSI toward the baseplate). In an example, the force exerted by the spring can be several orders of magnitude greater than the weight of the HSI, wherein the combination of the weight of the HSI and the force exerted by the spring is slightly less than the lifting force on the HSI created by the pump. Including both the pump and the spring in the manner described above allows for the heat exchanger to be operated independent of its orientation without appreciable performance degradation, as the large force exerted by the spring (relative to the weight of the HSI) prevents the thickness of the air bearing between the baseplate and the HSI from becoming too large. In other words, as the spring force is the dominant force opposing the air bearing, the force equilibrium between the air bearing pressure (pushing the HSI and the baseplate apart), the spring force (pushing the HSI and baseplate together), and the weight of the HSI (which can act to either separate or push together the HSI and the baseplate depending upon orientation of the heat exchanger) will not alter much regardless of whether the heat exchanger is oriented horizontally, vertically, or inverted.

The baseplate includes a series of spiral-shaped grooves, such that when the HSI rotates relative to the baseplate, a lifting force is generated between the baseplate and the HSI, wherein the lifting force increases as the rotational speed of the HSI increases relative to the baseplate. Thus, as a motor causes the HSI to rotate with increased rotational velocity relative to the baseplate, the lifting force created becomes sufficient to maintain the air gap between the baseplate and the HSI, such that the air bearing becomes a hydrodynamic air bearing (and the pump is no longer needed to establish a hydrostatic air bearing and maintain the air gap). In other words, the lifting force created by the relative rotation between the HSI and the baseplate is much greater than the weight of the HSI, and the force exerted by the spring maintains the desired thickness of the air gap between the baseplate and the HSI. The pump can be controlled as a function of rotational velocity of the HSI. For example, when the rotational velocity of the HSI reaches a threshold, the pump can be disabled.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1A:
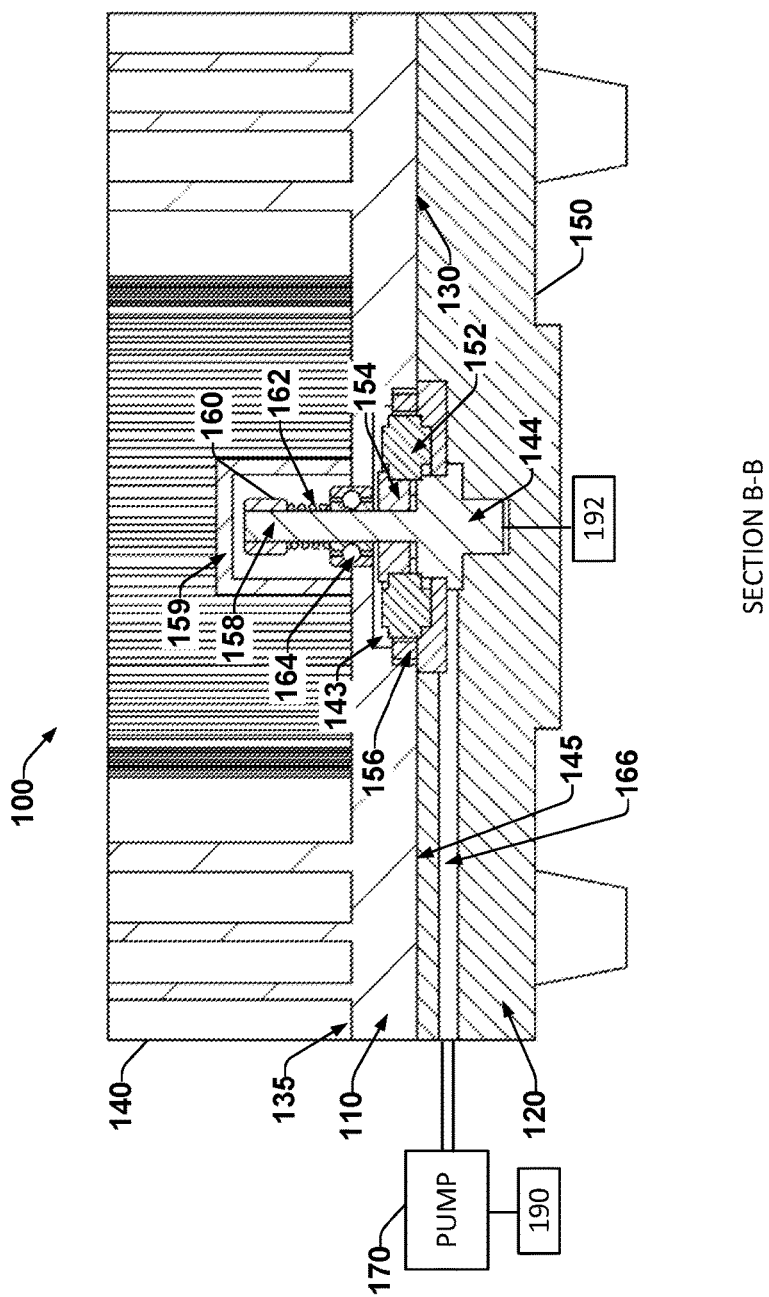
FIG. 1A is a sectional view of a heat exchanger, according to an embodiment.

Various technologies pertaining to heat extraction from an underlying structure are presented, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Further, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

The various embodiments presented herein relate to a heat exchanger that is configured to extract heat from an underlying substrate. Heat can be extracted by way of an air gap formed between an impeller and a substrate, wherein heat passes from a baseplate to a heat sink impeller (HSI) via the air gap. As noted above, orientation of a conventional heat exchanger (such as the one depicted in FIG. 6) is limited to a single, fixed orientation—e.g., with the baseplate being placed on top of a component's surface and the heat sink impeller (HSI) being above the baseplate, due to the weight of the HSI playing a prominent role in regulating the thickness of the air gap. If the orientation of the conventional heat exchanger were to reversed, for example, such that the HSI is below the baseplate, then the size of the air gap would be larger than desired and performance of the heat exchanger would be negatively impacted.

Further, there is often a tradeoff between frictional torque upon startup of the heat exchanger and minimizing the air gap thickness. On the one hand, minimizing the air gap improves the thermal performance; this can be achieved by using a stronger spring to counteract the lifting force from the spiral grooves. However, on the other hand, using a stiff spring leads to higher frictional torque upon startup (i.e. before the speed is high enough to generate significant hydrodynamic lifting force in the air bearing), which can be problematic for many motor designs. By utilizing a pump to provide an initial air gap that is further maintained by rotation of the HSI, a spring can be utilized that applies a force of greater magnitude relative to the HSI than is used in a conventional approach, thus minimizing the mass effect of the HSI and enabling the heat exchanger to be operated independent of its orientation without negatively impacting its performance.

Figure 1B:
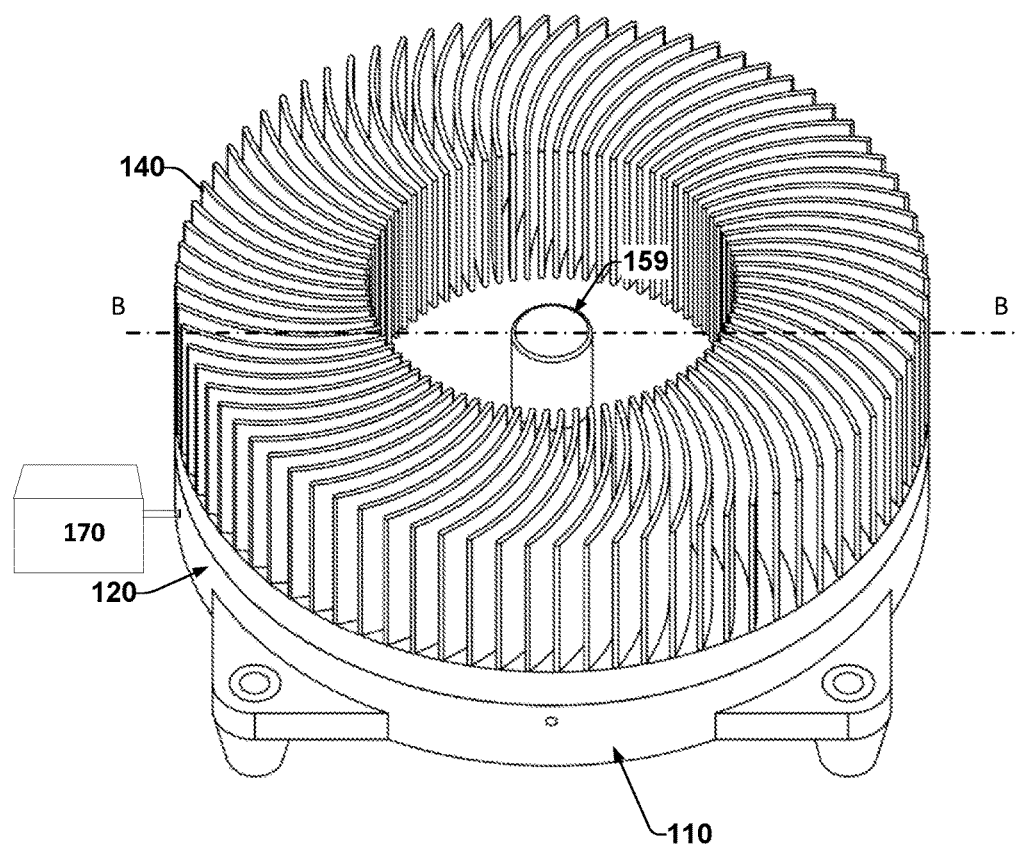
FIG. 1B is an isometric view of the heat exchanger, according to an embodiment.
Figure 1C:
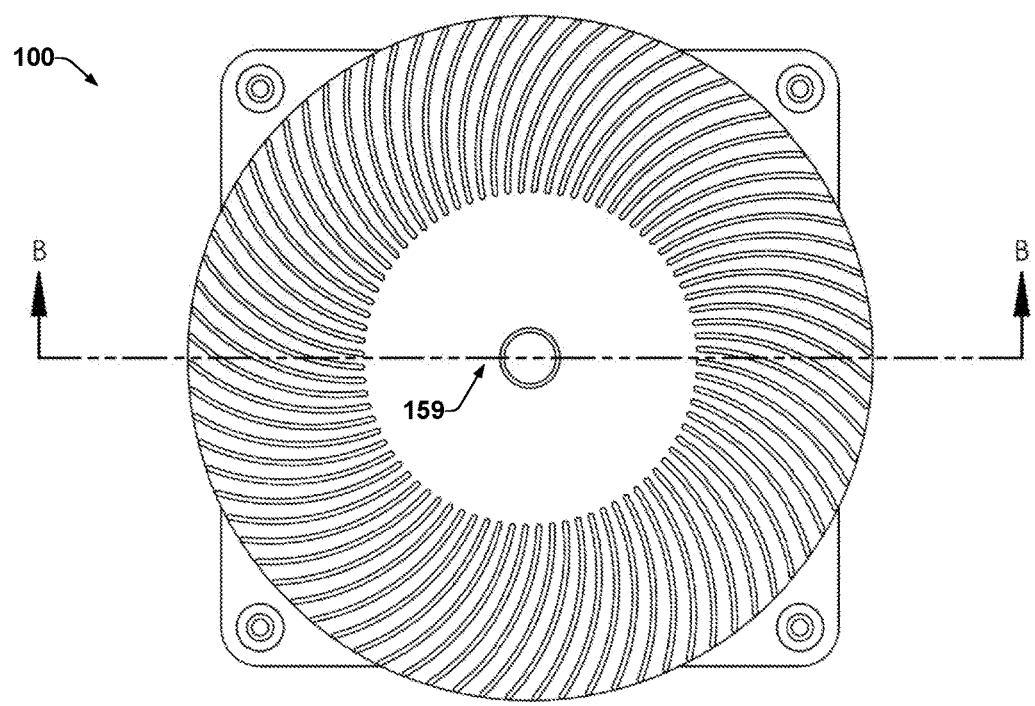
FIG. 1C is an overhead view of the heat exchanger, according to an embodiment

FIGS. 1A-C present a heat exchanger 100 configured to extract heat energy from an underlying substrate, wherein FIG. 1A is a sectional view along B-B of FIG. 1B, and FIG. 1C is an overhead view of the heat exchanger 100. As shown, the heat exchanger 100 comprises a HSI 110 that is configured to rotate above a stationary baseplate 120, wherein an airflow generated by the HSI 110, when rotating, causes heat energy to be extracted from the baseplate 120. The HSI 110 comprises a first surface (lower surface) 130 and a second surface (upper surface) 135, wherein the first surface 130 and the second surface 135 form opposite surfaces, and further, a plurality of blades 140 extend from the second surface 135. The HSI 110 further includes a cavity 143 that is configured to retain a motor 144.

The baseplate 120 comprises a third surface (top surface) 145 and a fourth surface (bottom surface) 150, wherein the third surface 145 and the fourth surface 150 are opposite surfaces. During operation, the baseplate 120 is positioned on a component (not shown), wherein the component can be a central processing unit (CPU) or other device that during operation generates heat, and it is desired to extract the heat from the component to facilitate efficient operation of the component, e.g., extract heat to mitigate the thermal brick wall problem, as previously described. In an embodiment, the bottom surface 150 of the baseplate 120 is adjacent to a surface of the component to facilitate heat extraction from the component into the baseplate 120.

The motor 144 can be a brushless motor, and is fixed to the baseplate 120 in the cavity 143. The motor 144 includes a stator 152 and a stator clamp 154 that stabilizes the stator 152. The motor 144 further includes a rotor 156 corresponding to the stator 152, wherein the rotor 156 is affixed to the HSI 110. A stationary shaft 158 extends from the baseplate 120, through the motor stator 152 and stator clamp 154, and into a cavity above the HSI 110 formed by a sealing cap 159 that prevents leakage from the air bearing between the HSI 110 and the baseplate (e.g., prevents air from escaping through a cavity defined by the sealing cap 159). Experimentally, inclusion of the sealing cap 159 in the heat exchanger 100 has been shown to improve efficiency of the heat exchanger 100. At least an upper portion (furthest from the motor 144) of the shaft 158 is threaded. A rotatable threaded nut 160 is placed on the shaft 158, wherein rotation of the nut 160 causes the nut 160 to move up and down the shaft 158. A compression spring 162 having a first end and a second end is positioned around the shaft 158, wherein the nut 160 contacts the first end of the compression spring 162 and an inner race of a bearing 164 contacts the second end of the compression spring 162. The bearing 164 (having the inner race and an outer race is positioned on the shaft 158, wherein the outer race of the bearing 164 is affixed to the HSI 110 (so that the outer race rotates as the HSI 110 rotates), and the inner race of the bearing 164 is movable axially along the shaft 158 but does not rotate with the HSI 110.

The baseplate 120 can further include a channel 166, wherein in the embodiment depicted in FIG. 1A, the channel 166 extends parallel to the surface 145 of the baseplate 120 to a center region of the baseplate 120 (e.g., into the cavity 143 where the motor 144 rests). It is to be understood that other arrangements are contemplated; for instance, the channel 166 may extend from the bottom of the baseplate 120 into the cavity, such that the channel 166 is not parallel to the surface 145 of the baseplate 120. A pump 170 is connected to the channel 168 at the exterior of the baseplate 120, wherein the pump 170 can be a diaphragm pump, or other pump suitable to inject air into the channel 166. In an embodiment, an output of the pump 170 can be directly attached to the channel 166 at the exterior surface of the baseplate 120, or the pump 170 can be connected via a pipe 172, or other suitable connection.

Operation of the heat exchanger 100 is now described. Initially, an operator of the heat exchanger 100 can set the compressive force applied by the compressive spring 162 between the HSI 110 and the baseplate 120 by rotating the nut 160 with respect to the shaft 158 such that the nut 160 moves axially along the shaft 158. As the nut 160 is moved towards the baseplate 120, more compressive force is generated by the compressive spring 162, while as the nut is moved away from the baseplate 120, less compressive force is generated by the compressive spring 162. When the heat exchanger 100 is not being operated, the compressive force generated by the compressive spring 162 causes the first surface 130 of the HSI 110 to be in contact with the third surface 145 of the baseplate.

As further described, during operation of the HSI 110, various forces are established which can force the HSI 110 to lift away from the baseplate 120. When operated, a distance between the first surface 130 of the HSI 110 and the third surface 145 of the baseplate 120 may be desired to facilitate optimum heat extraction from the baseplate 120 and the underlying component. However, during operation of the HSI 110, the distance between the first surface 130 of the HSI 110 and the third surface 145 of the baseplate 120 may be greater than desired, which reduces the heat extraction efficacy of the heat exchanger 100. The compressive spring 162 addresses this issue by applying a force (spring force $F_{spring}$) against the second surface 135 of the HSI 110, e.g., the compressive spring 162 functions to push the HSI 110 towards the baseplate 120. As noted above, the magnitude of the spring force $F_{spring}$ can be adjusted by adjusting the position of the nut 160 on the shaft 158. The position of the HSI 110 axially along the shaft 158 is not fixed; rather, as noted above, the bearing 164 (which is affixed to the HSI 110) is moveable along the shaft 158, such that the HSI 110 can be separated from the baseplate 120 by an air gap (referred to herein as an air bearing).

As mentioned, the heat exchanger 100 can have an initial, first operational state wherein neither the pump 170 nor the motor 144 are operational, and the HSI 110 is positioned such that the HSI 110 is sitting on the baseplate 120, wherein the first surface 130 of the HSI 110 is in contact with the third surface 145 of the baseplate 120, as shown in FIG. 1A. An intermediate, second operational state can occur upon activation of the pump 170, wherein, during operation of the pump 170 a first flow of air is pumped along the channel 166 and exits near the center of the baseplate 120, resulting in an upward force applied to the first surface 130 of the HSI 110, thereby causing the HSI 110 to lift away from the baseplate 120. Thus, the first flow of air causes an air gap G to be formed between the first surface 130 of the HSI 110 and the third surface 145 of the baseplate 120.

With the air gap G formed by operation of the pump 170 and the HSI 110 being displaced from the baseplate 120, the heat exchanger 100 can switch to a third operational state, wherein the motor 144 is energized and causes the HSI 110 to rotate about the shaft 158. The baseplate 120 includes spiral grooves on the third surface 145 extending from the exterior of the baseplate 120 towards an axis of the baseplate 120, and rotation of the HSI 110 relative to the baseplate 120 creates an airflow through the grooves, resulting in a lifting force being applied to the HSI 110 (i.e., a second flow of air is established), wherein the lifting force is a function of rotational velocity of the HSI 110 relative to the baseplate 120 (i.e., the greater the rotational velocity of the HSI 110, the greater the lifting force). When the HSI 110 reaches a threshold rotational velocity, the air gap G can be maintained by the lifting force that corresponds to such a rotational velocity. Therefore, in a fourth operational state, the first flow of air generated by the pump 170 can be terminated, e.g., the pump 170 can be switched off with the air gap G being maintained by the above-described lifting force associated with the HSI rotation and the second flow of air into the spiral grooves.

In summary, at startup of the heat exchanger 100, the air emitted by the pump 170 into the channel 166 (the first flow of air) results in formation of the air gap G as a hydrostatic air bearing between the first surface 130 of the HSI 110 and the third surface 145 of the baseplate 120. When the air gap G is formed (such that the HSI 110 is not in contact with the baseplate 120), the motor 144 is started and the rotational velocity of the HSI 110 increases. Upon the HSI 110 reaching a threshold rotational velocity, the second flow of air that flows from the exterior of the heat exchanger 100 into the spiral grooves of the baseplate 120 and towards the terminus of such grooves results in sufficient lifting force to maintain the air gap G as a hydrodynamic air bearing between the first surface 130 of the HSI 110 and the third surface 145 of the baseplate 120, at which point the pump 170 is turned off.

When the heat exchanger 100 is to be stopped, the pump 170 can be reactivated, such that air placed in the channel 166 by the pump 170 supports maintenance of the air gap G, and the motor 144 is ceased, causing the rotation of the HSI 110 to slow, such that the HSI 110 is separated from the baseplate 120 by the hydrostatic bearing generated by the pump 170. When the HSI stops rotating, operation of the pump 170 is ceased and the HSI 110 lowers onto the baseplate 120. The pump 170 and the motor 144 can be controlled by controllers 190 and 192, respectively, wherein the controllers 190 and 192 can be or include ASICs, FPGAs, microprocessors, microcontrollers, etc.

During operation of the heat exchanger 100, heat is transferred from the component into the baseplate 120, across the air gap G, and into the HSI 110 (e.g., by any of conduction, convection, and/or radiation). The blades 140 function as both heat conductors conducting heat away from the baseplate adjacent portion of the HSI 110 and fan blades to draw (pump) cooling air from the ambient surroundings. Accordingly, heat from the component is rejected into the ambient air as the air passes over the blades of the HSI 110 (alternatively stated, the HSI/baseplate/component is cooled by the passage of the HSI blades 140 through the cooler ambient air).

The air gap G comprises a portion of the thermal circuit, and therefore it is important to ensure that it has a desired width to maintain a low thermal resistance and avoid performance loss of the heat exchanger 100. The width of the air gap G can be of any desired value, e.g., about 10 microns (10 μm). As mentioned, the air gap G can be initially maintained by a hydrostatic air bearing generated by pump 170 to provide air at a higher-than-ambient pressure to the inner radial portion of the air gap G, and is analogous to the familiar example of a puck sitting on a layer of air on an air hockey table.

As noted above, the air gap G sustained with a hydrodynamic air bearing is achieved by utilizing a series of spiral-shaped grooves to generate a lifting force when the HSI 110 rotates relative to the baseplate 120. More specifically, the third surface 145 of the baseplate 120 is patterned with a plurality of spiral grooves extending inward (toward the center) from the external (radially outermost) edge of the baseplate 120. With a hydrodynamic air bearing (e.g., resulting from rotation of the HSI 110 relative to the baseplate 120), the lifting force (in a direction opposite the spring force) increases as the rotational velocity of the HSI 110 increases. Below a critical velocity, the lifting force is not enough to separate the HSI 110 from the baseplate 120 (i.e., first surface 130 of the HSI 110 and the third surface 145 of the baseplate 120 come into physical contact).

Under normal operation at a desired speed (e.g., design speed of the heat exchanger 100), the heat exchanger 100 uses a hydrodynamic air bearing to generate the lifting force to keep the HSI 110 separated from the baseplate 120. The lifting force generated by the hydrodynamic air bearing has traditionally been counteracted by a combination of a light spring force and the weight of the HSI 110 (as conventional heat exchangers are limited to operating in one configuration). As previously mentioned, the HSI 110 is moveable along the axis of the shaft 158, as the inner race of the bearing 164 is moveable along the axis of the shaft 158 (i.e., the spring force pushes down on the inner race of the bearing 164 while the outer race of the bearing 164 rotates with the HSI 110, thereby allowing the HSI 110 to rotate while the bearing 164 moves along the shaft 158). When the HSI 110 is stopped (not moving, motor 144 is disengaged and pump 170 is off), the mass of the HSI 110 and the spring force generated by the spring 162 push the HSI 110 down into contact with the baseplate 120.

Figure 6:
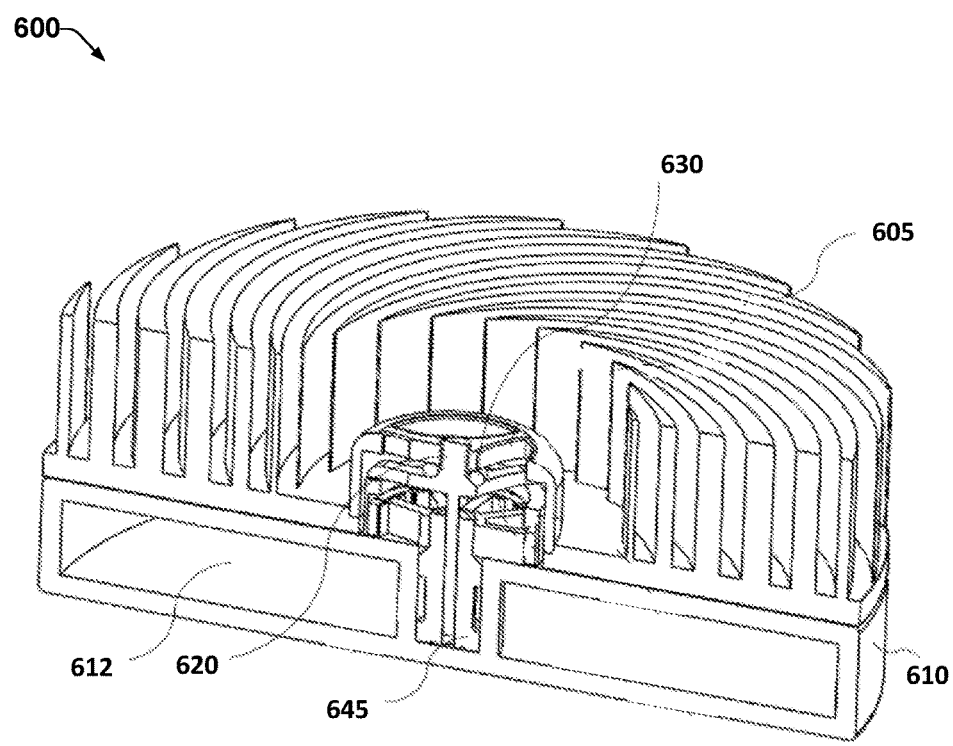
FIG. 6 is an illustration of a prior art design of a heat exchanger.

With reference to the conventional system presented in FIG. 6 (prior art), accelerating from this stopped condition up to the design speed, and in the process exceeding the critical speed where the hydrodynamic air bearing becomes viable, can be a challenge, particularly where the spring force is much greater than the force of gravity acting on the mass of the HSI 110. Applying an anti-friction/anti-wear coating to either or both the HSI 110 (e.g., first surface 130) and the baseplate 120 (e.g., third surface 145) can reduce the frictional force and avoid adhesive wear (e.g., galling) between the HSI 110 and the baseplate 120, but the torque required at startup is substantial and requires a high performance motor and motor controller.

Furthermore, the light spring force generated by the spring 630 of the heat exchanger 600 has to be tuned depending on the orientation of the heat exchanger 600; too little spring force results in an excessive width of the air bearing gap with diminished thermal performance, while too much spring force results in prohibitively large frictional torques between the HSI 605 and the baseplate 610 during startup of the heat exchanger 600. In practice, a spring force appropriate for the horizontal orientation (the orientation presented in FIG. 6) of the heat exchanger 600 will not be sufficient (i.e., strong enough) for operation of the heat exchanger 600 in non-horizontally aligned orientations, e.g., with the heat exchanger 600 in the inverted (i.e., the baseplate 610 is located above the HSI 605) or vertical orientations (i.e., the baseplate 610 and the HSI 605 are vertically aligned).

As presented herein, orientation independence is important for productizing a thermal management technology. The orientation of the heat exchanger 100 in an end use is not always known ahead of time (e.g., heat exchangers for cooling CPUs may be used in PCs oriented horizontally or vertically), and some end uses may change orientation in situ. Thus, the ability to confer orientation independence to the heat exchanger 600 is desired.

Figure 2A:
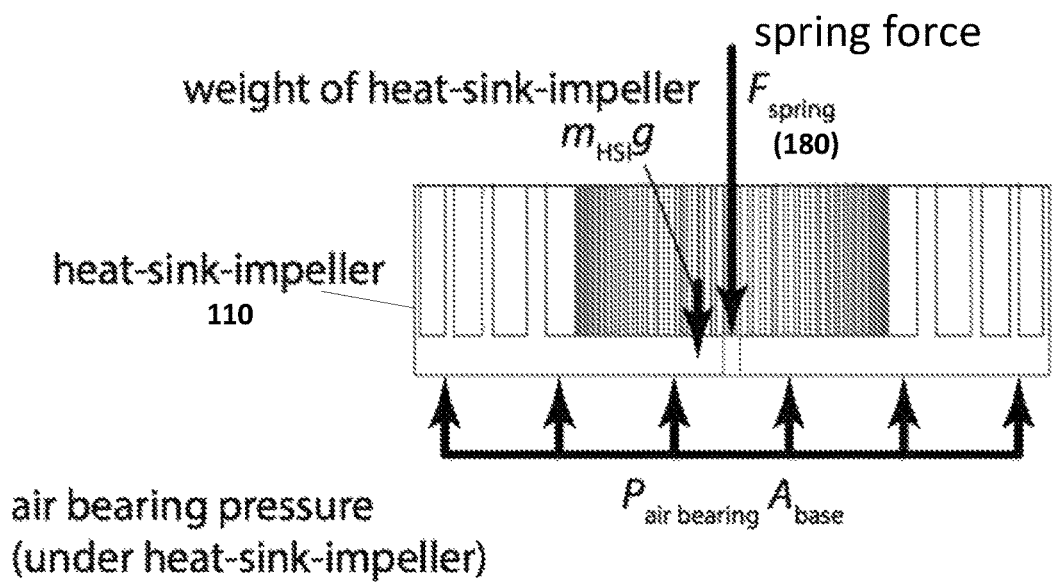
FIG. 2A illustrates a free body diagram of forces acting upon an impeller having a first orientation, according to an embodiment.

The pump 170 can generate pressure of a sufficient magnitude to ensure that the lifting force (in a direction opposite the spring force) on the HSI 110 greatly exceeds the weight of the HSI 110. FIG. 2A illustrates a free body diagram of the HSI 110. As shown, the weight of the HSI 110 and the spring force, $F_{spring}$ (generated by spring 162) act in a downward direction, and the force resulting from the pressure of the air bearing ($P_{air\ bearing} A_{base}$) acts in an upward direction, wherein $P_{air\ bearing} A_{base}$ is a combination of the area-averaged pressure exerted by the air bearing $P_{air\ bearing}$ and the area upon which the pressure is applied, $A_{base}$. The force $P_{air\ bearing} A_{base}$ on the HSI 110 due to the air bearing pressure is generated by the pump 170 and/or the rotating HSI 110. The large lifting force resulting from the hydrostatic air bearing generated by the pump 170 (line 1) facilitates utilization of the spring 162 that can apply a large force $F_{spring}$ in the downward direction to oppose the lifting force of the air bearing, wherein $P_{air\ bearing} A_{base}$ (generated initially by the pump 170 and subsequently by the rotating HSI 110) is substantially larger than the weight of the HSI 110. If the spring force $F_{spring}$ is of sufficient magnitude, $F_{spring}$ will be the dominant force opposing the static air bearing force $P_{air\ bearing} A_{base}$, and the effect of the weight of the HSI 110 on the position of the HSI 110 becomes negligible compared with that of the spring force $F_{spring}$, as shown by the respective length of the lines respectively depicting the spring force $F_{spring}$, the weight of the HSI 110 $m_{HSI}g$ (the product of the mass of the HSI, $m_{HSI}$, and the acceleration due to gravity, g), and the air bearing force $P_{air\ bearing} A_{base}$ in FIG. 2A. Accordingly, with $F_{spring}$ having a sufficient magnitude, orientation of the heat exchanger 100 is no longer constrained to the HSI 110 being positioned above the baseplate 120 such that the shaft 158 is vertical), and the heat exchanger 100 can be operated in any orientation, e.g., the shaft 158 may be vertical, horizontal, inverted, etc., and any effect on the width G of the air gap caused by the weight of the HSI 110 is rendered negligible.

Figure 2B:
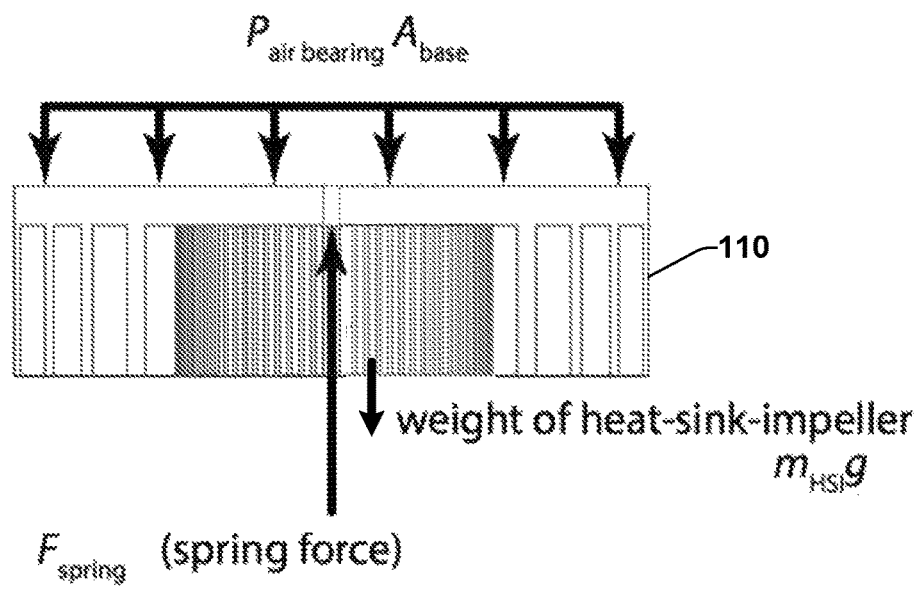
FIG. 2B illustrates a free body diagram of forces acting upon an impeller having a second orientation, according to an embodiment.

As shown in FIG. 2B, with the heat exchanger 100 inverted, and the weight of the HSI 110 operating in a direction that would cause the air gap G to open, as depicted with the respective line lengths, the magnitude of the weight of the HSI 110 is sufficiently small that the spring force $F_{spring}$ dominates, with the width of the air gap G being mostly a function of the opposing forces $F_{spring}$ and the force created by the air bearing, $P_{air\ bearing} A_{base}$. The force equilibrium between the air bearing force ($P_{air\ bearing} A_{base}$, separating the HSI 110 and baseplate 120), the spring force ($F_{spring}$, pushing the HSI 110 and baseplate 120 together), and the weight of the HSI 110 (which depending upon the orientation of the heat exchanger 100, can act to either separate or push together the HSI 110 and baseplate 120) does not vary by an appreciable amount when the orientation changes. Hence, the weight of the HSI 110 plays a negligible role in the force balance presented in FIGS. 2A and 2B, and the orientation of the heat exchanger 100 has negligible effect on the operation of the HSI 110 relative to the baseplate 120. As described above, the spring force $F_{spring}$ can be adjusted by adjusting the position of the nut 160 on the shaft 158.

Per the foregoing, the directions of forces $F_{spring}$ and $P_{air\ bearing} A_{base}$ are in opposing directions, regardless of the orientation of the heat exchanger. Accordingly, per the embodiments herein, at the desired operational speed of rotation of the HSI 110, the spring force $F_{spring}$ opposes the lifting force $P_{air\ bearing} A_{base}$ of the hydrodynamic air bearing generated by the HSI 110, and insensitivity to orientation of the heat exchanger 100 is engendered as the width of the air bearing gap G will not change significantly due to changes in orientation of the heat exchanger 100; accordingly, the heat exchanger 100 can be utilized in any orientation.

To facilitate minimizing the effect of weight of the HSI 110, $P_{air\ bearing} A_{base} \gg$ weight of the HSI 110, and $F_{spring} \gg$ weight of the HSI 110. More specifically, $F_{spring}$ can be n-times greater than the weight of the HSI 110, where n is a value greater than 1. In an exemplary embodiment, the lifting force $P_{air\ bearing} A_{base}$ generated by the pump 170 on a HSI 110 having a diameter of 4 inches can be about 4 kgf, or about 20 times the weight of the HSI 110. Thus, with a spring force $F_{spring}$ of about 20× (20 times) the weight of the HSI 110 being applied to the HSI 110 by the spring 180, the lifting force $P_{air\ bearing} A_{base}$ of the hydrodynamic air bearing generated at an operational speed of rotation of the HSI 110 is capable of opposing such a spring force $F_{spring}$ while sustaining a desired air gap G (e.g., an air gap of about 10 microns), regardless of the orientation of the heat exchanger 100. Accordingly, in an initial operating condition, the pump 170 generates a hydrostatic air bearing (air gap) with sufficient pressure (force) to displace the bearing surface (surface 130) of the HSI 110 and the spring 162 to form the initial air gap G. Subsequently, the motor 144 is engaged and rotation of the HSI 110 is initiated, wherein the HSI 110 generates a secondary airflow in the air gap with sufficient pressure to overcome the spring force being applied by the spring 162 upon the bearing 164. Accordingly, the weight of the HSI 110 is negligible in the force balance governing the air gap width, and hence, in an application where the heat exchanger 100 is being utilized upside down (i.e., the HSI 110 is spinning beneath the baseplate 120), the weight of the HSI 110 acting to further separate the HSI 110 from the baseplate 120 (i.e., widen the air gap G) is negligible relative to the spring force applied by the spring 162 on the bearing 164 (and thus the HSI 110), and the air gap G is maintained at a desired width.

As previously mentioned, a heat exchanger that utilizes a purely hydrodynamic air bearing has to overcome the engineering challenge of physical contact between the HSI 110 and the baseplate 120 upon startup (e.g., high frictional torque on startup, and the associated wear of the HSI 110 and the baseplate 120). Conversely, a hydrostatic air bearing can be utilized to exclusively provide the air bearing, which eliminates the physical contact between the HSI 110 and the baseplate 120, but requires the addition of the pump 170 and its associated power consumption. The purely hydrostatic air bearing has the advantage that the operating point of the pump 170 (e.g., the flow rate) would determine the width of the air gap G (air bearing) and would be independent of the rotational speed of the HSI 110. A hybrid approach that uses a hydrostatic air bearing (e.g., from the pump 170) upon startup and shutdown and a hydrodynamic air bearing (e.g., from the HSI 110) during normal operation at the desired rotational speed of operation has the advantage of greatly reducing the operating time of the pump 170, which significantly increases its longevity (startup and shutdown comprise a small percentage of the operating time in most applications). As presented herein, the various embodiments are applicable to the hydrostatic air bearing and the combined hydrostatic/hydrodynamic designs.

Turning back to FIG. 1A, the heat exchanger 100 can further include a height sensing apparatus that is configured to measure a width of the air gap G. In an exemplary embodiment, the height sensing apparatus can include an emitter configured to emit a pulsed beam of light (or other electromagnetic energy, e.g., infrared) onto the first surface 130 of the HSI 110, wherein the light is reflected to a receiver. The emitter and the receiver can be located in the baseplate 120. Based upon time of flight of the beam of light, the width G of the air gap can be determined, such that any drift in the width of the air gap G from a desired value can be compensated for. For example, the time of flight information can be transmitted to the controller 194, wherein the controller 194 can instruct the controller 190 to activate and/or control the pump 170, such that width of the air gap G is controlled. For instance, when the width of the air gap G drops beneath a predefined threshold, the pump 170 can be activated or controlled to increase the amount of air into the channel 166, thereby increasing the width of the air gap G. Conversely, when the width of the air gap G is above a predefined threshold, the pump 170 can be stopped or caused to decrease an amount of air directed into the channel 166, resulting in decrease of the width of the air gap G.

Figure 3:
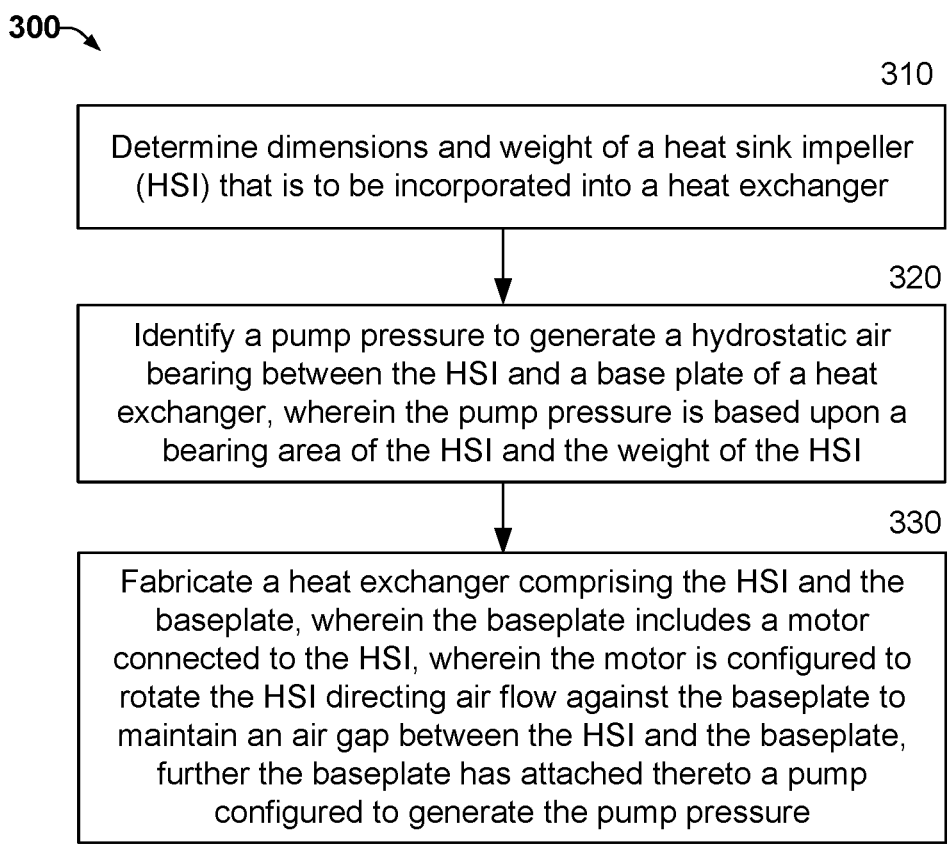
FIG. 3 is a flow diagram illustrating an exemplary methodology pertaining to determining various forces to create an air gap during operation of a heat exchanger.
Figure 4:
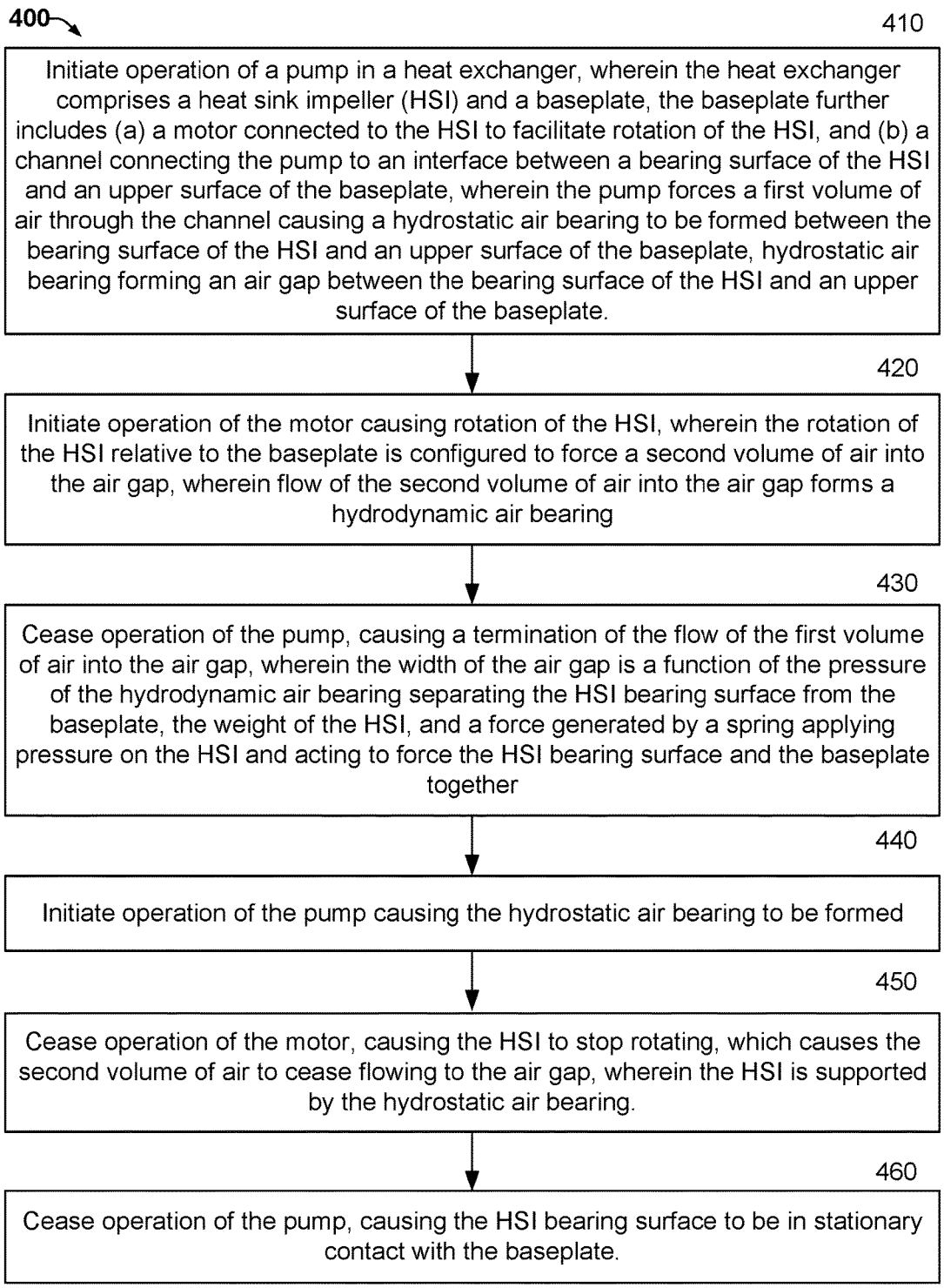
FIG. 4 is a flow diagram illustrating an exemplary methodology pertaining to operating a heat exchanger with an air gap formed between an impeller and a baseplate.

FIGS. 3 and 4 illustrate exemplary methodologies relating to designing, fabricating, and implementing a heat exchanger comprising an air gap and a HSI. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement the methodologies described herein.

FIG. 3 illustrates an exemplary methodology 300 relating to designing and fabricating a heat exchanger comprising a baseplate and an HSI. At 310, various dimensions of the HSI are determined, wherein the dimensions can include the diameter of the HSI, from which a bearing area of the HSI can be obtained. Further, the weight of the HSI is also determined.

At 320, a pump pressure is determined, wherein the pump pressure is based upon the area of the bearing surface of the HSI and the mass of the HSI. As previously mentioned, the determined pump pressure $P_{air\ bearing} A_{base}$ can be substantially greater than the weight of the HSI, e.g., $P_{air\ bearing} A_{base}$ can be 5 times greater than the weight of the HSI, 10 times greater than the weight of the HSI, 20 times greater than the weight of the HSI, 40 times greater than the weight of the HSI, 100 times greater than the weight of the HSI, etc.

At 330, the heat exchanger is fabricated, wherein the heat exchanger comprises the HSI and the baseplate as depicted in FIG. 1A. As described above, a spring is located on a shaft and applies force on the HSI, wherein the force generated by the spring acts on the HSI to push the HSI against the baseplate (e.g., the bearing surface of the HSI is pushed towards the upper surface of the baseplate). The force exerted by the spring, in an example, can be 5 times greater than the weight of the HSI, 10 times greater than the weight of the HSI, 20 times greater than the weight of the HSI, 40 times greater than the weight of the HSI, 100 times greater than the weight of the HSI, etc. The HSI is retained on the shaft by means of a nut (or similar device) that presses on the spring, wherein the force applied by the spring on the HSI can be adjusted by adjusting the position of the nut on the shaft, e.g., tightening or loosening the nut. A pump is attached to the baseplate, wherein the pump is configured to pump air against the HSI, which causes the HSI to be displaced from the baseplate with the pumped air creating an air bearing therebetween. The motor is configured to rotate the HSI which directs air flow into the air bearing to maintain the air bearing when operation of the pump is ceased.

FIG. 4 illustrates an exemplary methodology 400 relating to operation of a heat exchanger comprising a HSI and a baseplate. At 410, operation of a pump is initiated, wherein the pump is connected to, and pumps air, into a heat exchanger. The heat exchanger comprises a HSI and a baseplate as depicted in FIG. 1A and described above. The spring exerts a force on the HSI, wherein the force generated by the spring acts on the HSI to push the HSI against the baseplate (e.g., the bearing surface of the HSI is pushed towards the upper surface of the baseplate). During operation, the pump forces a first volume of air through a channel (i.e., the channel 166) causing a hydrostatic air bearing to be formed between the bearing surface of the HSI and an upper surface of the baseplate, the hydrostatic air bearing being an air gap between the bearing surface of the HSI and an upper surface of the baseplate. With the air gap formed, the spring is compressed as the HSI is displaced axially along the shaft, with the bearing surface of the HSI moving away from the upper surface of the baseplate.

At 420, operation of the motor is initiated causing rotation of the HSI, wherein the relative rotation between the HSI and the baseplate causes a second volume of air to flow into and out of the air gap, wherein flow of the second volume of air into and out of the air gap forms a hydrodynamic air bearing.

At 430, operation of the pump is ceased, causing termination of the flow of the first volume of air into the air gap, wherein the width of the air gap becomes a function of the pressure of the hydrodynamic air bearing separating the HSI bearing surface from the baseplate, the weight of the HSI, and a force generated by a spring applying a force on the HSI and acting to force the HSI bearing surface and the baseplate together. Operation at this steady-state condition thus does not require the pump.

At 440, operation of the pump is re-initiated, causing the hydrostatic air bearing to be formed in the air gap in conjunction with the hydrodynamic air bearing generated by rotation of the HSI.

At 450, operation of the motor is ceased, causing the HSI to stop rotating, wherein suspension of rotation of the HSI causes the second volume of air to cease flowing to the air gap. With the second volume of air no longer being present, the HSI is separated from the baseplate by the hydrostatic air bearing produced by the pump.

At 460, operation of the pump is ceased after the HSI rotation has stopped, causing the HSI to move axially along the shaft, with the HSI bearing surface coming to rest in stationary contact with the baseplate.

Figure 5:
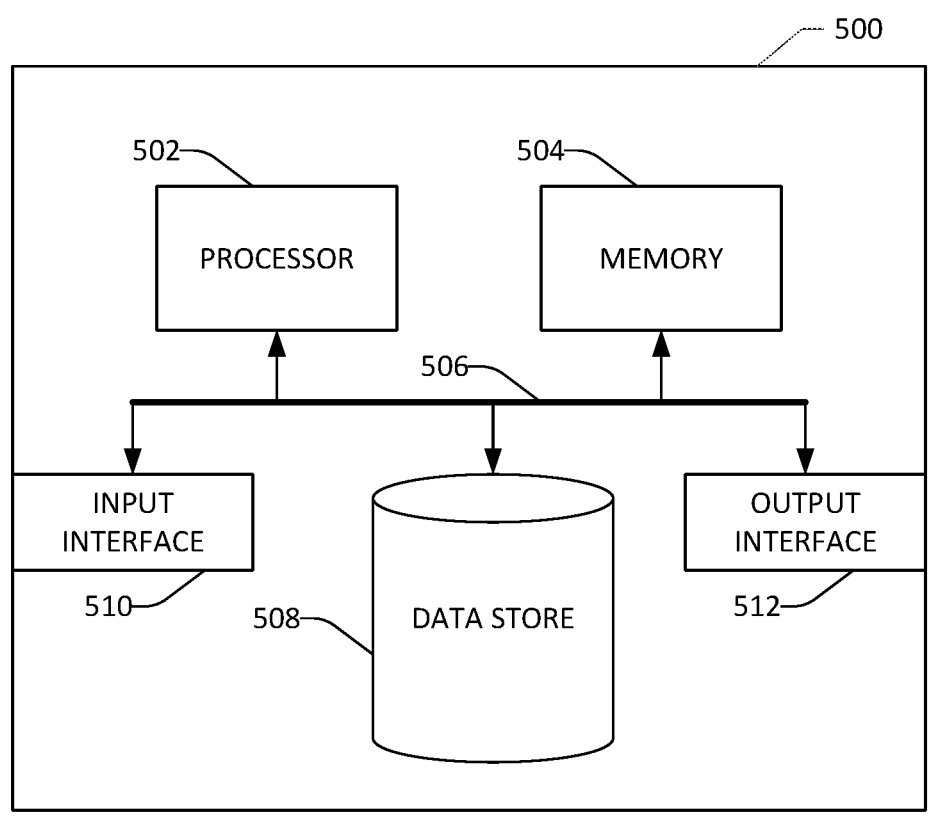
FIG. 5 illustrates an exemplary computing device.

Referring now to FIG. 5, a high-level illustration of an exemplary computing device 500 that can be used in accordance with the systems and methodologies disclosed herein is illustrated. For instance, the computing device 500 can be utilized as any of controllers 190, 192, 194 to control operation of the pump 170, the operation of the motor 155, control the width G of the air gap based upon information generated by the receiver, etc. The computing device 500 includes at least one processor 502 that executes instructions that are stored in a memory 504. The instructions may be, for instance, instructions for implementing functionality described as being carried out by one or more components discussed above or instructions for implementing one or more of the methods described above. The processor 502 may access the memory 504 by way of a system bus 506. In addition to storing executable instructions, the memory 504 may also store operating parameters, required operating parameters, and so forth.

The computing device 500 additionally includes a data store 508 that is accessible by the processor 502 by way of the system bus 506. The data store 508 may include executable instructions, operating parameters, etc. The computing device 500 also includes an input interface 510 that allows external devices to communicate with the computing device 500. For instance, the input interface 510 may be used to receive instructions from an external computer device, from a user, etc. The computing device 500 also includes an output interface 512 that interfaces the computing device 500 with one or more external devices. For example, the computing device 500 may display text, images, etc., by way of the output interface 512.

Additionally, while illustrated as a single system, it is to be understood that the computing device 500 may be a distributed system. Thus, for instance, several devices may be in communication by way of a network connection and may collectively perform tasks described as being performed by the computing device 500.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. The terms "component" and "system" are also intended to encompass hardware configured to cause certain functionality to be performed, where such hardware can include, but is not limited to including, Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above structures or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim

What is claimed is:

1. A heat exchanger comprising:
    a baseplate that comprises:
        a shaft that extends orthogonally from an upper surface of the baseplate at a center of the baseplate; and
        a channel that extends from an outer surface of the baseplate to the upper surface of the baseplate;
    a heat sink impeller (HSI) that comprises:
        a first surface that faces the upper surface of the baseplate, the first surface has an area $A_{base}$;
        a second surface opposite the first surface;
        a plurality of vanes that extend from the second surface;
        an aperture at a center of the HSI, wherein the shaft extends through the aperture and the HSI is rotatable about the shaft, a compressive spring is placed on the shaft and applies a force $F_{spring}$ on the HSI towards the baseplate, the HSI has a weight, and further wherein $F_{spring}$ is greater than the weight of the HSI; and
    a pump, wherein the pump is connected to the channel at the outer surface of the baseplate, the pump is configured to generate a first air flow to create an air bearing between the HSI and the baseplate with a width G and an average pressure $P_{air\ bearing}$ acting on the first surface of the HSI, wherein $P_{air\ bearing} A_{base}$ exceeds the weight of the HSI and acts in opposition to $F_{spring}$, the magnitudes of $P_{air\ bearing} A_{base}$ and $F_{spring}$ exceed the weight of the HSI.

2. The heat exchanger of claim 1, further comprising a motor that causes the HSI to rotate about the shaft, wherein rotation of the HSI relative to the baseplate creates a force that acts in opposition to $F_{spring}$.

3. The heat exchanger of claim 1, wherein the HSI comprises a sealing cap that defines a cavity, wherein the shaft is positioned within the cavity.

4. The heat exchanger of claim 1, wherein $F_{spring}$ is at least twenty times the weight of the HSI.

5. The heat exchanger of claim 1, wherein $P_{air\ bearing} A_{base}$ is at least twenty times the weight of the HSI.

6. The heat exchanger of claim 1, wherein a nut is fastened to an upper portion of the shaft, and further wherein $F_{spring}$ is adjusted by alteration of a position of the nut along the shaft.

7. The heat exchanger of claim 1, wherein the first air flow creates a hydrostatic bearing between the HSI and the baseplate, and a second air flow caused by rotation of the HSI relative to the baseplate creates a hydrodynamic bearing between the HSI and the baseplate.

8. The heat exchanger of claim 1, further comprising a sensor that is configured to output a signal that is indicative of a distance between the upper surface of the baseplate and the first surface of the HSI.

9. The heat exchanger of claim 8, further comprising a controller configured to:
    receive the signal output by the sensor; and
    control operation of the pump to change the magnitude of $P_{air\ bearing} A_{base}$ to adjust the width G of the air bearing.

* * * * *